May 21, 1963 F. T. THOMPSON 3,090,929

CONTROLLER CIRCUITRY WITH PLUSE WIDTH MODULATOR

Filed Dec. 18, 1959 2 Sheets-Sheet 1

WITNESSES

John E. Healy, Jr.

James T. Young

INVENTOR

Francis T. Thompson

BY Ernest P. Klipfel

ATTORNEY

May 21, 1963 F. T. THOMPSON 3,090,929

CONTROLLER CIRCUITRY WITH PLUSE WIDTH MODULATOR

Filed Dec. 18, 1959 2 Sheets-Sheet 2

United States Patent Office 3,090,929
Patented May 21, 1963

3,090,929
CONTROLLER CIRCUITRY WITH PULSE WIDTH MODULATOR

Francis T. Thompson, Verona, Pa., assignor to Westinghouse Electric Corporation, East Pittsburgh, Pa., a corporation of Pennsylvania Filed Dec. 18, 1959, Ser. No. 860,575
8 Claims. (Cl. 332—9)

The present invention relates generally to controller circuitry and more particularly to a pulse width modulator circuit with minor loop feedback.

Minor loop feedback provides a powerful tool for stabilizing control systems. However, the maximum minor loop gain obtainable is limited by the stability of the circuit. This invention provides minor loop feedback for a pulse width modulator circuit while obtaining a high degree of stability. In applying minor loop feedback to a pulse width modulator, drift can be considerably reduced by obtaining direct current isolation between the output of the pulse width amplifier and the summing junction. At the same time uniform gain can be maintained from direct current to several hundred cycles per second frequency of the analog input signals.

Accordingly, it is an object of the present invention to provide a pulse width modulator with minor loop feedback having direct current isolation between the output of the pulse width modulator and the summing junction.

Another object of the present invention is to provide minor loop feedback to a pulse width modulator capable of maintaining uniform gain from direct current to several hundred cycles per second of analog input signal frequency.

Another object of the present invention is to provide a pulse width modulator with a low impedance minor loop feedback signal at the summing junction so as not to adversely affect the direct current stability of the pulse width modulator.

Another object of the present invention is to provide a pulse width modulator with minor loop feedback having substantial minor loop gains while obtaining substantial improvement in stability of the system.

Further objects and advantages of the present invention will be readily apparent from the following detailed description taken in conjunction with the drawing, in which.

Figure 1:
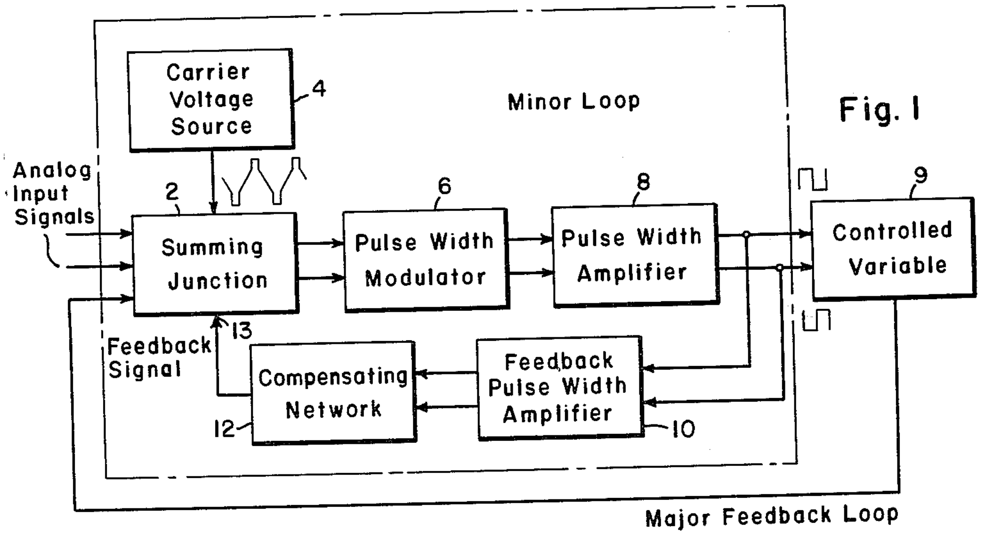
FIGURE 1 is a block diagram of an illustrative embodiment of the invention.

A feedback control system having a minor loop is shown in the illustrative embodiment of FIGURE 1. The mixing input network or summing junction 2 is adapted to receive a modified triangular waveform having a narrow pulse added at the peaks of the triangular waveform from the carrier voltage source 4. The carrier waveform is modulated by the summation of the analog input signals and the feedback signal so as to provide a modulated signal to the pulse width modulator 6. The pulse width modulator 6 thus samples the analog input signals and the feedback signal and provides an output of pulse widths of fixed frequency. The output from the pulse width modulator 6 has a predetermined minimum pulse width determined by the narrow pulses added to the peaks of the triangular waveform from the carrier source 4. The output from the pulse width modulator 6 is further amplified by a pulse width amplifier 8 and fed to a controlled variable 9. An electrical signal is fed back to the summing junction 2 to complete the major feedback loop.

In order to obtain system stability it is usually necessary to reshape the frequency response characteristic of the major loop. This may be done very effectively using minor loop feedback as explained in detail in chaper 8 of the book "Introduction to the Design of Servomechanism," by John L. Bower and Peter M. Schultheiss, published in 1958 by John Wiley and Sons. The present invention is concerned with high performance embodiments of minor loop feedback.

Figure 2:
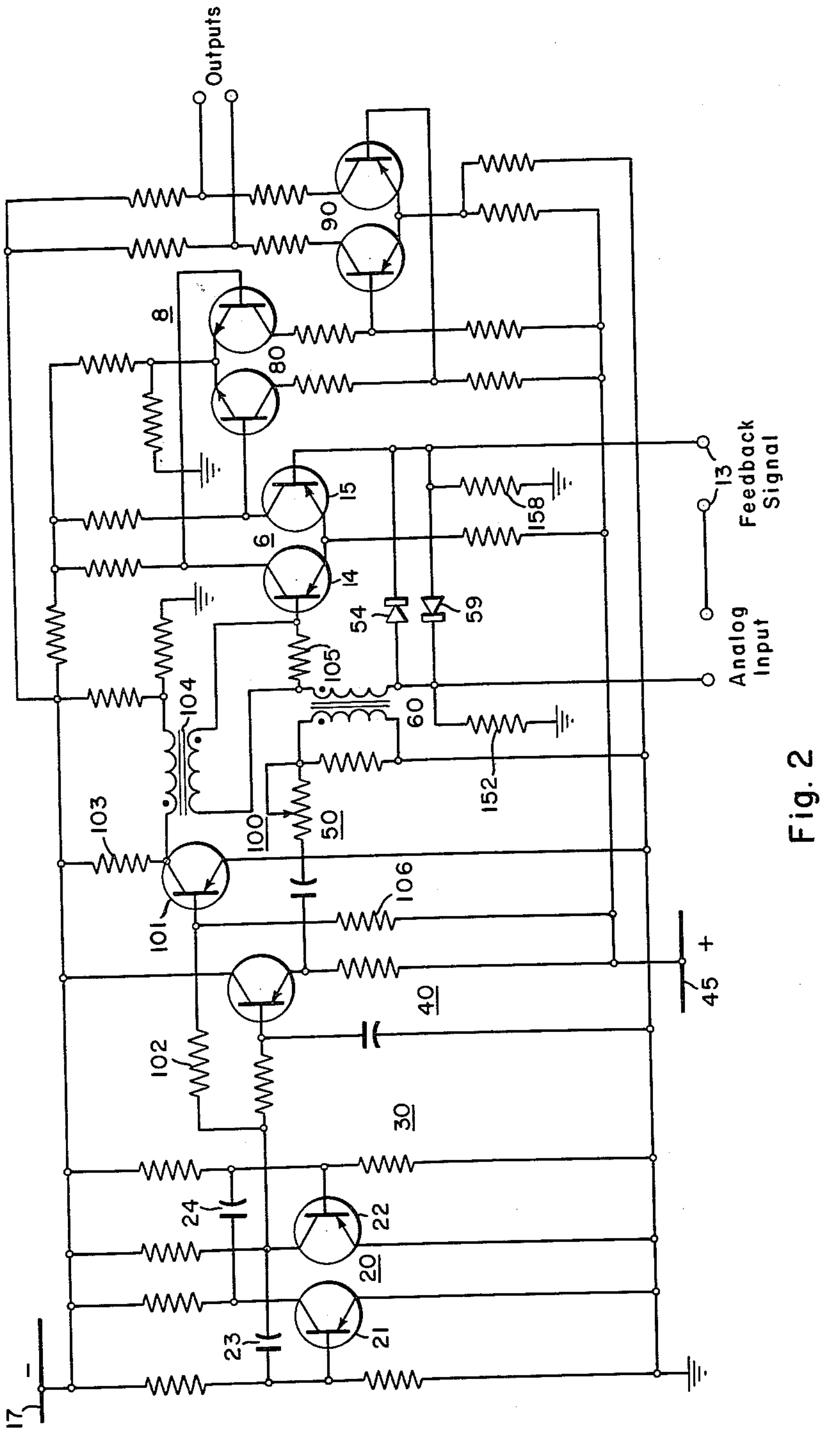
FIG. 2 is an electrical schematic diagram of the pulse width modulator circuit.

Referring to FIG. 2, the pulse width modulator circuit is a modified form of the circuit disclosed and claimed in my copending application, Serial No. 860,474, filed December 18, 1959, and assigned to the same assignee. As more fully described therein, the mixing input network or summing junction 2 comprises generally transformer 60 which provides a triangular carrier waveform in the series loop between the bases of the comparator transistors 14 and 15 of the pulse width modulator 6. The transformer provides isolation of the secondary voltage from the D.-C. supplies 17 and 45. In the present invention, diode clamps 54 and 59 between the bases of the comparator transistors 14 and 15 of the pulse width modulator 6 prevent the magnitude of the analog input signals from exceeding the amplitude of the modified triangular waveform. If the non-conducting voltage band of these diodes is unsuitable for a particular application a double anode Zener diode having an appropriate non-conducting band may be connected from one base to the other.

The carrier voltage source 4 comprises generally an astable multivibrator 20, an integration circuit 30 and emitter follower circuit 40. The astable multivibrator 20 is connected in the conventional manner to be biased by the negative bus bar 17 and comprises transistors 21 and 22 having cross coupled input and outputs by means of the capacitors 23 and 24. The astable multivibrator 20 has the equivalent of two quasi stable states forming a square wave at the collector of the transistor 22. The square wave is integrated by the integration circuit 30 with the resultant triangular waveform passing through the emitter follower circuit 40 to the transformer 60. The present invention provides a saturating transformer circuit 100 driven by the square wave output from the astable multivibrator 20 for generating narrow pulses synchronized to be added to the peaks of the triangular carrier waveform. The negative portion of the square wave output drives the transistor 101 to saturation through the resistor 102. A resistor 106 connected to the positive bus 45 provides blocking current. The collector of the transistor 101 is negatively biased by the bus bar 17 through a resistor 103. Upon conduction of the transistor 101 the primary side of the saturating transformer 104 has current flow therethrough to ground. The transformer 104 saturates during conduction providing a narrow pulse which is added by the secondary resistor 105 to the triangular waveform appearing across the RC circuit 50 of the summing junction 2 so as to obtain a modified triangular waveform. This modified waveform appears across the series combination of the secondaries of transformers 104 and 60. The pulse width modulator 6 therefore has an output having a linear relationship to the analog input signals and the feedback signal. The output will have, however, a minimum pulse width since the amplitude of the modified triangular waveform is made to exceed the magnitude of the analog input signals in the manner previously described. The pulse width amplifier 8 further increases the level of the pulse width output. The pulse width amplifier 8 comprises a first section of amplifiers 80 and a second section of ampliers 90.

These sections are more fully described and claimed in the aforementioned copending application. For the purposes of the present invention, it may be said that the number of sections may be altered, depending upon the input signal level and the desired output power level.

In accordance with the present invention, a feedback pulse width amplifier 10 is adapted to amplify a portion of the output of the pulse width amplifier 8 and the amplified portion is filtered by the compensating network 12 to provide a direct current feedback signal at the terminals 13 of the summing junction 2 as a function of the direct current component of the amplified portion of the output. The fedback signal is isolated from the D.-C. supply voltages as subsequently described. The modified triangular waveform is isolated from the D.-C. supply voltages by transformers 60 and 104. The analog input is preferably isolated from the D.-C. supply voltages. Resistors 152 and 158 provide a D.-C. current path from the bases of the comparator transistors to ground. This arrangement results in high null stability as described in the copending patent application.

Figure 3:
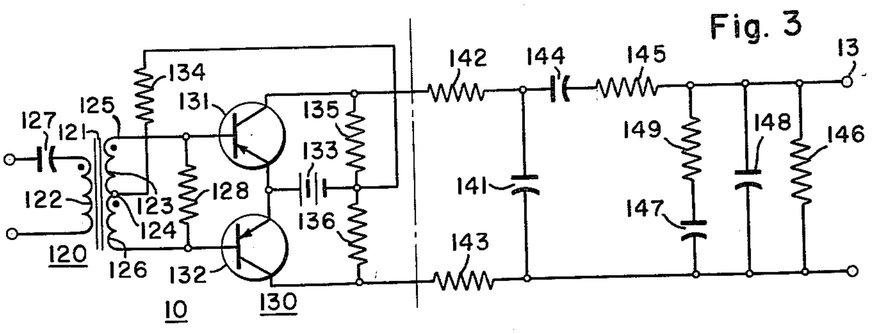
FIG. 3 is an electrical schematic diagram of the minor loop feedback circuit.

An electrical schematic diagram of the feedback pulse width amplifier 10 and compensating network 12 connecting the output back to the input means, specifically the terminals 13 of the summing junction 2, is shown in FIGURE 3. The pulse width modulator 6 may be considered to have input means in the form of the summing junction 2 and output means in the form of the pulse width amplifier 8. A portion of the output from the output means is amplified by the feedback pulse width amplifier 10. The output of the pulse width amplifier is connected to the feedback pulse width amplifier 10 through circuit means 120 comprising a transformer 121 having a primary winding 122 and a secondary winding 123 having a center tapped connection 124 and end tap connections 125 and 126. The transformer 121 is wound in accordance with the polarity dot convention wherein current flow into the dotted end of the winding drives the transformer core toward positive saturation and current flow into the opposite end of the winding tends to drive the transformer core toward negative saturation. The output from the output means of the pulse width modulator is connected to the primary winding 122 of the transformer through capacitive means 127 which removes the direct current component of the pulse width amplifier output from the transformer primary. The resultant voltage on the secondary side 123 of the transformer is applied to push-pull amplifier 130 comprising a first transistor 131 and a second transistor 132 having a common emitter circuit connected to a biasing potential source 133. The transistors 131 and 132 are shown to be of the PNP type polarity but it is to be understood that transistors at NPN polarity may be used with appropriate changes in the circuit polarities. Base driving current is supplied through a resistor 134 connecting the negative polarity side of the biasing source 133 to the center tap connection 124 of the transformer 121. The base electrode of the transistor 131 is connected to the end terminal connection 125 while the base electrode of the transistor 132 is connected to the end terminal connection 126 so that the voltage signal appearing at the secondary side 123 from the pulse width amplifier output is applied between the base electrodes of the transistors 131 and 132.

The base driving current to the transistors 131 and 132 is supplied through the resistor 134. Most of the voltage from the source 133 appears across the resistor 134, resulting in a nearly constant current. The transistor having the more negative base voltage, as determined by the polarity of the voltage induced across the secondary winding 123, conducts and clamps its base voltage at approximately emitter potential. The other transistor is held cut-off by the voltage appearing across the transformer secondary 123. Transistors 131 and 132 conduct alternately, producing an output signal across resistors 135 and 136, connected across the collector electrode to the negative side of the voltage source 133, and results in an amplified portion of the output having the same waveform as the output from the pulse width amplifier 8.

A resistive element 128 is connected across the secondary winding 123. The purpose of the resistive element 128 is to prevent saturation of the transformer 121 under the condition of a step change in input from minimum width to maximum width or vice versa. The maximum volt second area that the transformer must support, neglecting the load of the transistors 131 and 132, is the product of the magnitude of the voltage input, the magnitude of the capacitive element 127 and the magnitude of the resistive element 128 reflected to the primary side of the transformer 121.

In such a manner direct current isolation is obtained between the output of pulse width amplifier and the summing junction 2. However, when the pulse width of the output from the pulse width amplifier becomes extremely narrow, the magnitude of the voltage induced during the wide portion of the pulse width output becomes very small. This is because the transformer 121 cannot pass a direct current component so that the volt-time integral of the wide and narrow pulses must be equal. Since the amplitude of the wide portion of the pulse is proportional to the amplitude of the voltage pulses to the primary side 122 of the transformer 121, the minimum pulse width at which the circuit may operate can be reduced by increasing the amplitude of the output pulses. However, the base-emitter voltage rating of the transistors 131 and 132 determines the limit to the maximum amplitude of the pulse output. It can be seen that if the pulse width output is reduced beyond a minimum value the output will abruptly change from a maximum value to zero. This change would adversely affect minor loop stability. For this reason, the triangular waveform of the carrier voltage source 4 is altered by adding narrow pulses at the peaks of the triangular waveform. As long as the voltage excursion of the analog input signals is prevented from exceeding the amplitude of the modified triangular waveform by biased diode clamps, or any other suitable manner, the output from the pulse width amplifier 8 will have a minimum pulse width so that the output from the pulse width amplifier 8 will not abruptly change from a maximum value to zero and thereby adversely affect minor loop stability.

The output signal appearing across the resistors 135 and 136 is connected to the compensating network 12. The compensating network 12 is selected to fulfill desired lag or lead breaks. For instance, the capacitor 141 and resistive elements 142 and 143 along with resistor 136 if transistor 131 is conducting, or resistor 135 if transistor 132 is conducting, may have their circuit parameter selected to provide an open major loop lead break at a desired value. The capacitor 141 also acts to filter the ripple from the push-pull switching pulse width feedback amplifier 10. The impedance level of the capacitor 141 and resistive elements 142, 143, 135, and 136 are chosen so as to be low enough so that the following impedances would be reasonably non-loading.

If an output which has a flat frequency response from D.C. to several hundred cycles is desired, the compensation network 12 would consist of only resistors 142 and 143 and capacitor 141. The output 13 would be taken across capacitor 141.

The effect of a lag network providing a lag break at very low analog input frequencies and a lead break at higher frequencies in the major open loop may be readily obtained. The lead break may be obtained by proper selection of the capacitor 144 in series combination with resistor 145, the resistor 146, resistors 142 and 143, and either resistor 135 or 136 depending upon which transistor 131 or 132 is conducting. The separation of the lag and lead breaks is determined by the minor loop gain. The magnitude of the resistor 146 is determined by the output impedance requirements with respect to the summing junction 2. The resistive element 145 has a magnitude chosen to raise the resistance level allowing a lower value of capacitance to be used for the capacitor 144 and also to reduce the loading on the open major loop lead break network previously described. Capacitors 147 and 148 and resistor 149 are included to provide minor loop stability. The flexibility, ease of design, and high performance obtained with this circuit illustrates the advantages available using this type of compensation. It is to be understood, however, that the compensating network illustrated is only by way of illustration and that numerous compensating networks may be used in accordance with the desired time delays of the circuit.

The compensating network 12 provides a direct current feedback signal at the terminals 13 having a magnitude and polarity responsive to the magnitude of the direct current component of the amplified portion of the output from the pulse width amplifier 8. The resultant feedback signal to the summing junction 2 stabilizes the circuit.

It is to be noted that the feedback pulse width amplifier 10 in the minor loop feedback path driving the compensating network 12 is ungrounded. The input signal to the feedback amplifier 10 and the voltage source 133 are floating with respect to any chassis ground and with respect to the direct current voltages of the pulse width modulator output. This permits the introduction of the feedback signal in a loop between the comparator bases which contains no path to the D.C. supplies as described in the aforementioned copending application. This results in high null stability.

Figure 4:
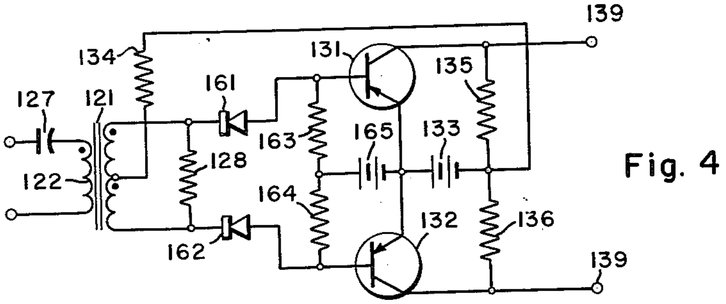
FIG. 4 is an alternate embodiment of a portion of the feedback circuit shown in FIGURE 3.

An alternate embodiment of the feedback pulse width amplifier 10 is shown in FIGURE 4 with the like components having identical reference characteristics. The circuit of FIGURE 4 permits a further increase in amplitude over the output pulses from the secondary of transformer 121 without subjecting the base electrodes of the transistors 131 and 132 to excessive destructive voltages. Semiconductor diodes 161 and 162 are connected between the base electrode of the transistor 131 and the end terminal 135, and the base electrode of the transistor 132 and the end terminal 126, respectively.

A direct current voltage source 165 positively biases the base electrode of each transistor 131 and 132 with respect to its emitter through resistors 163 and 164 respectively. The semiconductor diodes 161 and 162 are poled to block current flow when the voltage applied to their cathodes becomes more positive than the potential at the junction of resistors 163 and 164 serially connected across the base electrodes of the transistors. Both semiconductor diodes 161 and 162 alternately conduct during the time that small voltages are induced across the secondary winding 123 of the transformer 121. When large voltages are induced across the transformer secondary one diode or the other will block thereby protecting that transistor. Resistors 163 and 164 are chosen to shunt a small part of the driving current supplied through the resistor 134. The direct current voltages supplied to this amplifier is also obtained from an ungrounded supply, thereby retaining the advantages of the circuit shown in FIGURE 3. The output terminals 139 of the feedback pulse width amplifier as shown in FIG. 4 may be connected to a compensating network 12 for connection back to a summing junction 2 as previously described.

The use of push-pull amplifiers in the feedback amplifier is advantageous since for given transistor voltage ratings the feedback connection results in twice the output voltage swing. It is obvious to those skilled in the art that a diode could be substituted for the base-emitter diode of transistor 132 resulting in a single ended amplifier.

While a particular embodiment of the present invention has been described for the purposes of illustration, it is to be understood that all equivalents, modifications, and alterations within the spirit and scope of the invention are herein meant to be included.

I claim as my invention:

1. Control circuitry comprising a pulse width modulator including input means and having an output of fixed frequency and minimum pulse width, feedback amplifying means for amplifying the pulsed portion of said output, said amplifying means having respective input and output circuits, a coupling circuit connecting the modulator output to the input circuit of the amplifying means for passing the pulsed portion of modulator output and rejecting the D.C. portion of that output, whereby the amplifying means amplifies only the pulse waveform, and compensating means coupled to the output circuit of the amplifying means and responsive to the D.C. component of the amplified pulse waveform for providing a direct current feedback signal to the input means of said modulator.

2. Control circuitry comprising a pulse width modulator including input means and output means and having an output of fixed frequency and minimum pulse width, a push-pull amplifier having respective input and output circuits for amplifying a portion of said output, said amplifiers having respective input and output circuits, compensating means coupled between said output circuit and said input means, and circuit means connecting said output means to the input circuit of said amplifier, said circuit means comprising a transformer, capacitive means operably connected between said transformer and said output means, said transformer operably connected between said capacitive means and said amplifier, said capacitive means isolating the direct current component of the output from said transformer, said amplified portion having the same waveform as said output; said compensating means responsive to the magnitude of the direct current component of the amplified portion of said output for providing a direct current feedback signal to said input means.

3. Control circuitry comprising a pulse width modulator including input means and output means having an output of fixed frequency and minimum pulse width, an amplifier having respective input and output circuits, transformer means connecting the input circuit of said amplifier to said output means, capacitive means operably connected between said output means and said transformer means for isolating the direct current component of said output from said transformer means, resistive means operably connected to said transformer means for providing a discharge path for said capacitive means; the amplified portion of said output having the same waveform as said output; and compensating means coupled between said amplifier output circuit and said input means and responsive to the magnitude of the direct current component of the amplified portion for providing a direct current feedback signal to said input means.

4. Control circuitry comprising a pulse width modulator including input means and output means and having an output of fixed frequency and minimum pulse width, an amplifier comprising two transistors each having an emitter electrode, collector electrode and base electrode, said transistors connected in push-pull relationship and having a common emitter circuit connected to a predetermined polarity of a biasing potential source; transformer means having a primary winding and a center tapped secondary winding, each base electrode connected to a respective end of said secondary winding; means for connecting the center tap of said secondary winding to the opposite polarity of said biasing potential source; said primary winding connected in circuit relationship with said output means; compensating network means connected across said collector electrodes and providing a direct current feedback signal to said input means proportional to the direct current component of the waveform appearing across said collector electrodes.

5. Control circuitry comprising a pulse width modulator including input means and output means and having an output of fixed frequency and minimum pulse width, an amplifier circuit comprising two transistors each having an emitter electrode, collector electrode and base electrode, said transistors connected in push-pull relationship; transformer means having a primary winding and a center tapped secondary winding; said primary winding connected in circuit relationship with said output means; each base electrode connected to a respective end of said secondary winding; means connected to the center tap of said secondary winding for applying a base driving current to each said base electrode; said transistors being rendered alternately conductive as a function of the polarity of the voltage induced across said secondary winding; the amplified portion of said output having the same waveform as said output; compensating network means connected across said collector electrodes and providing a direct current feedback signal to said input means proportional to the direct current component of the waveform appearing across said collector electrodes.

6. Control circuitry comprising a pulse width modulator including input means and output means and having an output of fixed frequency and minimum pulse width, an amplifier comprising two transistors each having an emitter electrode, collector electrode and base electrode, said transistors connected in push-pull relationship and having a common emitter circuit connected to a predetermined polarity of the biasing potential source; transformer means having a primary winding and a center tapped secondary winding with two end taps; said primary winding connected in circuit relationship with said output means, a semiconductor diode for each transistor connecting its associated base electrode to a respective end tap of said secondary winding; each said semiconductor diode poled to allow current flow to its respective end tap; means for biasing each said diode in the forward direction with a predetermined magnitude of voltage and applying base driving current to each said base electrode; each said semiconductor diode blocking current flow to its associated base electrode when the magnitude of voltage induced in said secondary winding exceeds said predetermined magnitude; the amplified portion of said output having the same waveform as said output; compensating network means connected across said collector electrodes and providing a direct current feedback signal to said input means proportional to the direct current component of the waveform appearing across said collector electrodes.

7. Control circuitry comprising a pulse width modulator including input means and output means and having an output of fixed frequency, load means operably connected to said output means, said input means including a summing junction, a major feedback loop operably connected from said load means to said summing junction, a minor feedback loop for amplifying the pulsed portion of said output including means for rejecting the D.C. component of said output, and compensating means responsive to the magnitude of the direct current component of the amplified portion of said output for providing a direct current feedback signal to said summing junction.

8. Control circuitry comprising a pulse width modulator including input means and output means and having an output of fixed frequency and minimum pulse width, an amplifier for amplifying a portion of said output, said amplifier having respective input and output circuits, compensating means coupled between said output circuit and said input means, and circuit means connecting said output means to said amplifier, said circuit means comprising a transformer, capacitive means operably connected between said transformer and said output means, said transformer operably connected between said capacitive means and said amplifier, said capacitive means isolating the direct current component of the output from said transformer, said amplified portion having the same waveform as said output; said compensating means responsive to the magnitude of the direct current component of the amplified portion of said output for providing a direct current feedback signal to said input means.

References Cited in the file of this patent

UNITED STATES PATENTS

| | | |
|---|---|---|
| 2,292,816 | Bedford | Aug. 11, 1942 |
| 2,740,086 | Evans et al. | Mar. 27, 1956 |
| 2,785,236 | Bright et al. | Mar. 12, 1957 |
| 2,891,726 | Decker et al. | June 23, 1959 |
| 2,951,212 | Schmid | Aug. 30, 1960 |